Patented Mar. 14, 1950

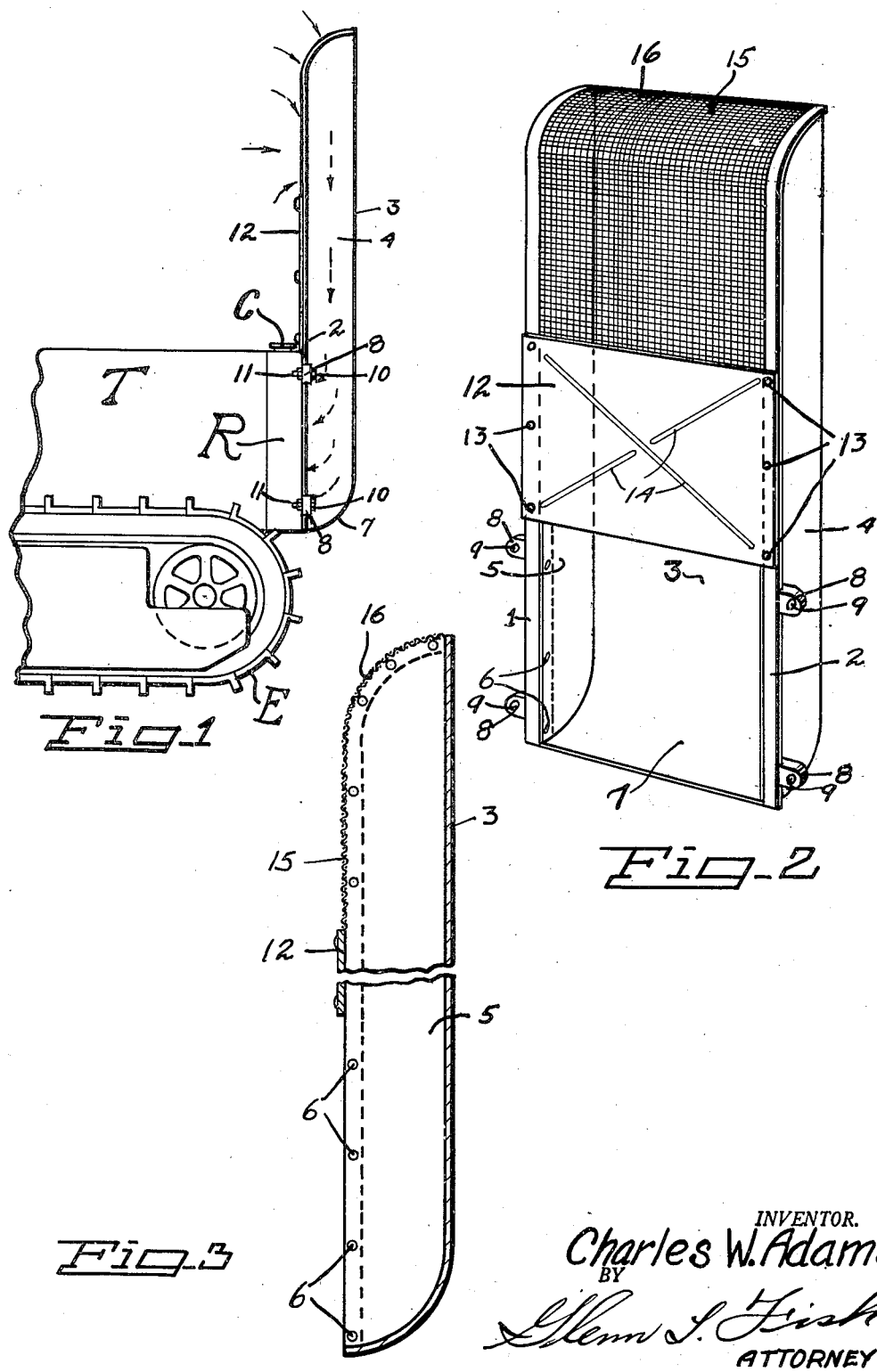

2,500,268

UNITED STATES PATENT OFFICE 2,500,268

INTAKE HOOD FOR AIR COOLING SYSTEMS

Charles W. Adams, Lewiston, Idaho

Application March 23, 1948, Serial No. 16,548

1 Claim. (Cl. 183—51)

The present invention relates generally to the air cooling systems for internal combustion engines employed in propelling automotive vehicles, and more specifically to an improved intake hood for an air cooling system for use as an attachment to a radiator or other desirable structure of the cooling system. While the attachment is well adapted for various purposes and uses, the hood is especially designed as a filter, sifter, or air cleaner, of the reticulated-screen type, for use with a tractor, or the air cooled engine of a grain harvesting implement of the combine type. In harvesting a grain crop the air cooling system of an internal combustion engine of the harvester is frequently clogged with straws, field dust, grass-hoppers, and other foreign elements, and the primary purpose of the novel intake hood is the elimination of these undesirable and harmful conditions, to insure efficiency in the operation of the engine and save time and labor in the harvesting season.

In its physical embodiment the intake hood, hollow head, or dust shield is composed of a minimum number of parts that may with facility be manufactured at low cost of production, the parts may be assembled with convenience, and the hood, as an attachment, may readily be fastened in proper position at the front of the air cooling system, for the performance of its functions.

The invention consists in certain novel features of construction and combinations and arrangements of parts as will hereinafter be more fully described, and particularly set forth in the appended claim.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of the invention.

Figure 1 is a view in side elevation of the novel air intake hood showing it attached at the front portion of a tractor having an internal combustion engine and air cooling system therefor.

Figure 2 is a perspective view of the hood as seen from the rear; and Figure 3 is a vertical sectional view of the upright hood.

In order that the general relation and utility of parts may readily be understood I have shown in Fig. 1 a portion of a tractor T having a usual radiator R and radiator cap C, and an endless portable track E; and the intake hood is attached in upright position at the front of the radiator to filter or cleanse the air currents passing by induction through the hood and radiator.

The hood, which may be fashioned of any suitable or desirable material, is of desired size and shape for installation with various types of radiators or other supporting members of an air cooling system, and as here shown I utilize two laterally spaced upright frame bars 1 and 2 that are united throughout their length by a closed front wall or plate 3 having side flanges 4 and 5 that are fastened, as by rivets 6 to the frame bars. The flat front wall terminates at its upper end with a straight edge bounding a top opening of the hood, and the lower end of the front plate terminates in a curved deflecting surface 7 for directing air currents through a lower outlet port of the hood into the radiator R.

For attaching the hood to the radiator or other support, each frame bar, near its lower end, is provided with two pairs of lugs or ears as 8, 8, drilled with holes 9, and attaching bolts 10 with nuts 11 are employed for securely mounting the hood in position.

At the back, or rear, of the hood and located at its approximately vertical center a cross plate or short wall 12 is riveted to the frame bars at 13, and this plate may be fashioned with reinforcing ribs 14, to aid in providing a rigid structure of the hood.

Because of its approximate central location at the rear of the hood, the cross plate or back wall 12 provides an upper air intake opening, and a vertically spaced lower outlet port at the rear of the hood.

The upper intake opening, it will be noted, is elevated above the ground surface where it is free of the ground dust stirred up by the endless track E of the tractor, and this opening is equipped with a reticulated screen 15 having a rounded top 16 enclosing the upper end of the hood. By locating the screen at the rear of the hood as shown, instead of at the front of the hood, the screen is more effective in cleaning the inducted air currents; and then the cleansed air currents are conveyed through the lower outlet port into the radiator. The air at the rear of the hood is less turbulent than at the front of the hood, and consequently straw or other foreign elements in the atmosphere are less likely to impinge against and clog the screen.

Having thus fully described my invention, what

I claim as new and desire to secure by Letters Patent is:

In an air-intake hood, the combination with a pair of upright laterally spaced frame bars having forwardly curved upper ends, a pair of vertically spaced attaching lugs near the lower end of each bar, a closed front wall having side flanges rigid with the frame bars, and an air-deflecting surface at the lower end of the front wall, of a rear cross plate forming an intermediate back wall rigid with the frame bars, said hood having an intake opening above the back wall and reticulated screen mounted in the opening forming a rounded top for the hood, and said hood also having an outlet port below the back wall opening from said deflecting surface.

CHARLES W. ADAMS.

REFERENCES CITED

The following references are of record in the file of this patent:

UNITED STATES PATENTS

| Number | Name | Date |
| --- | --- | --- |
| 1,496,661 | Dreier | June 3, 1924 |
| 1,751,739 | Jacobsen | Mar. 25, 1930 |
| 1,782,374 | Walls | Nov. 18, 1930 |
| 2,455,734 | Clausen | Dec. 7, 1948 |